Oct. 23, 1928.

G. RATTI

GOGGLES 1,688,433

Filed March 23, 1925  2 Sheets-Sheet 1

Inventor
G. Ratti
by Langner, Parry, Card & Langner
Attys.

Oct. 23, 1928.

G. RATTI 1,688,433

GOGGLES

Filed March 23, 1925  2 Sheets-Sheet 2

Inventor
G. Ratti
by Langner Parry Card & Langner
Att'ys

Patented Oct. 23, 1928.

1,688,433

UNITED STATES PATENT OFFICE.

GIUSEPPE RATTI, OF TURIN, ITALY.

GOGGLES.

Application filed March 23, 1925, Serial No. 17,821, and in Italy March 27, 1924.

The present invention relates to eye protecting screens or goggles for use by motorists or the like, that is to goggles in which the glass screens are carried by an attachment contacting with the wearer's face along its orbital cavity in order to enclose a space around each eye.

The present invention has for its object an attachment for goggles of the kind referred to, in which each screen is arranged in a frame which is entirely closed and is shaped in such a manner that its edge follows the sides of the nose and the configuration of the wearer's face and provides for easily replacing the glass screen without requiring the use of tools.

Figure 1:
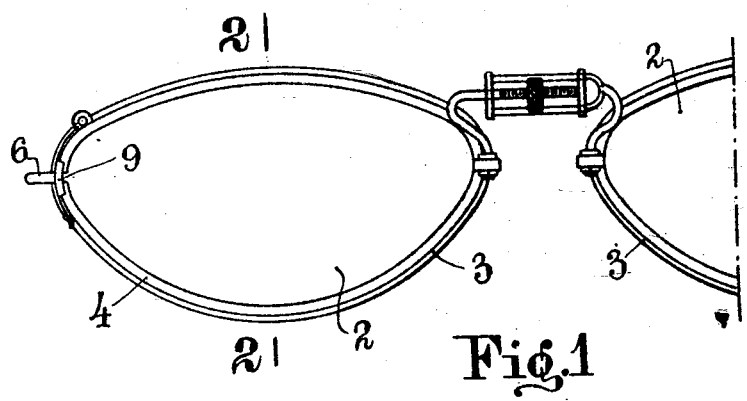
Figure 3:
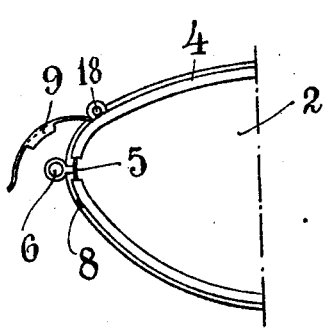
Figure 2:
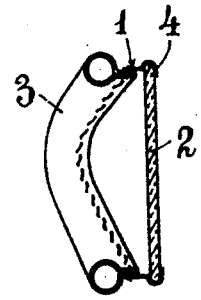
Figure 4:
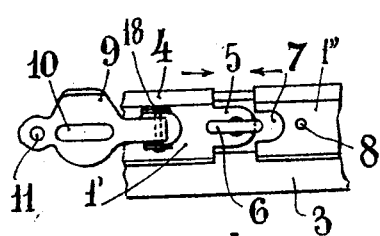
Figure 5:
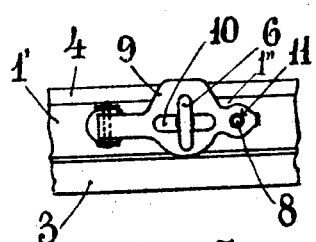
Figure 6:
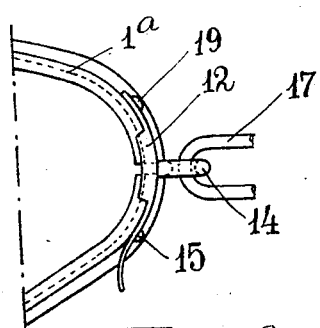
Figure 7:
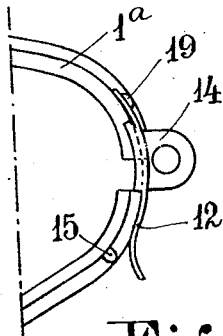
Figure 8:
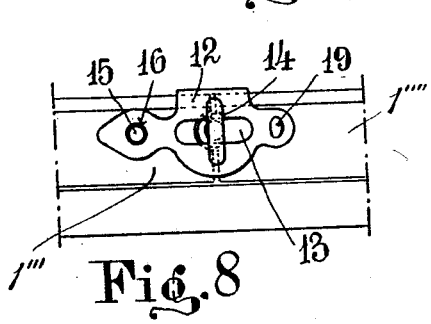
Figure 9:
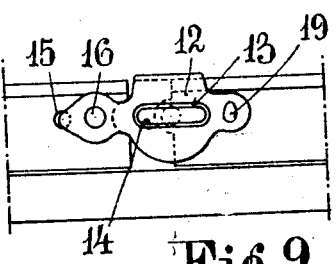
Figure 11:
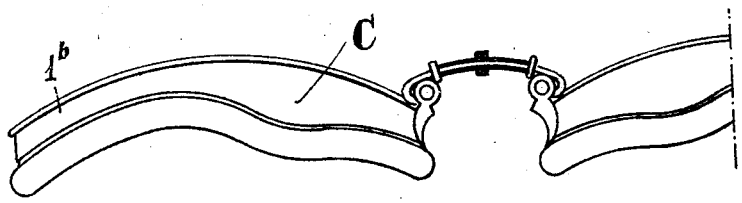
Figure 10:
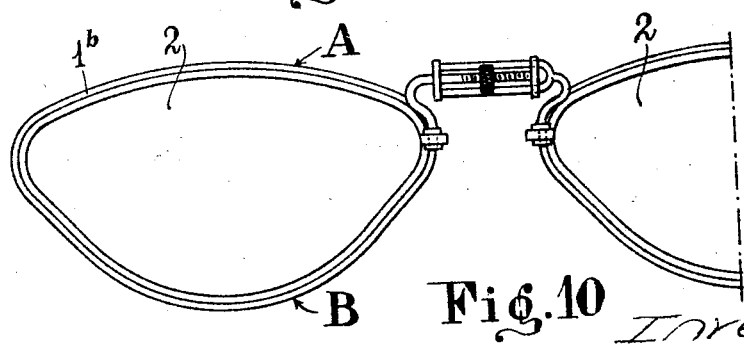

On the annexed drawing are shown by way of example some embodiments of the present invention, wherein Figure 1 is a fragmentary front view of a goggle; Figure 2 is a transverse section on line 2—2 of Figure 1; Figure 3 is a fragmentary front view of the outer side portion of said frame when expanded for changing its glass screen; Figure 4 is a detail side view to an enlarged scale; Figure 5 is another fragmentary detail view also to an enlarged scale; Figure 6 is a fragmentary front view of the outer side end of a second embodiment of said frame in closed position; Figure 7 is a similar view of the same in expanded position; Figures 8 and 9 are fragmentary side views corresponding with Figures 6 and 7 respectively; Figure 10 is a diagrammatic front view of modified form of a frame showing the configuration of the screen supporting frame and Figure 11 is the bottom view of the same.

As shown in Figures 1–5, each frame 1 intended to carry the screen 2, which may be of glass or of any other material, and having a soft lining 3 on its rear edge, consists of a band of metal or any other material having the required double bent shape and said band provides along its front edge a groove 4 open towards the inside and adapted to receive the edge of the screen 2. The band 1 provides a sleeve which is split in its outer side portion and has means for interconnecting and clamping on each other its adjoining ends at the sides of said split.

In the embodiment illustrated in Figures 1–5, one of said ends as 1' has an extending tongue 5 having a hole in which is mounted to rotate the stem of a key or fastener 6 while the other end 1' comprises a slot 7 and a hole 8. The band end 1' carrying the tongue 5 has pivoted thereon at 18 a link 9 having a slot 10 which may be passed over the fastener 6, and a pin 11 adapted to engage in the hole 8.

The operator after having positioned a glass screen 2 in position in the groove 4 causes the ends 1'—1'' of the band 1 (Fig. 4) to approach each other and then he moves down the link 9 on the adjoining ends 1'—1'' and causes the fastener 6 to pass through slot 10 in order to carry the pin 11 in engagement with the hole 8; thereafter the operator moves the said fastener crosswise into the position of Figure 5, the link 9 being thus held in position and keeping the adjoining ends of the band 1 clamped to each other.

The frame is thus completed and the screen 2 is engaged in position in the groove 4 of the same, while by a reverse operation said frame may be expanded as required for removing the screen and introducing a fresh screen in position.

The manipulation of the link 9 and fastener 6 may be made without the aid of any tool.

In the modification shown in Figures 6–9 the band 1ª provides on its end 1'''' a tongue 12 held at 19, and having a slot 13. On the same end a fastener 14 is pivoted with its stem passing through the slot 13 of the tongue 12.

The opposite end 1''' of the band 1ª has a projecting pin 15 which may engage a hole 16 in the tongue 12.

When the frame is closed, the hole 16 of the tongue 12 is engaged with the pin 15 and the said tongue is held in position by the fastener 14 which is arranged crosswise with respect to slot 13 and bears on the portions of said tongue at the sides of said slot 13 (see Figures 6 and 8).

To expand the frame the fastener 14 is rotated through 90° as by acting on a ring 17 which is linked therewith, and the tongue 12 is raised to release its hole 16 from pin 15, this operation being not longer prevented by the fastener 14 which at this time can pass within the slot 13.

The operator is thus able to expand the frame in order to remove the screen and introduce a fresh screen in position, and thereafter he engages again the tongue 12 by its hole 16 with pin 15 and rotates the fastener 14 through 90° to carry it crosswise with respect to slot 13 of tongue 12, this latter being again in position to interconnect the two ends 1''', 1'''' of said band.

A simple construction is thus provided because the tongue 12 may be fastened on the band 1ª by means of a rivet 19 and the resiliency of said tongue is sufficient to permit releasing it from pin 15. Further the fastener 14 which acts to lock the tongue in its engaged position is also adapted to be engaged by the ring 17 to which is attached a ribbon or fastener by means of which the goggle is positioned on the wearer's head.

To open the frame it is not necessary to remove the ring 17 from the fastener 14 and therefore hooks or the like are not required for attaching the ribbon or similar supporting member.

In order that the screen carrying frame shall contact with the nose sides and the adjacent portions of the wearer's face, the configuration shown in Figures 10 and 11 is used, the top portion of said frame having a flat arc shape while its lower portion has the shape of a deep arc and the side edge intended to contact with the wearer's nose is steep with respect to the larger diameter of the frame opening.

Such a configuration is show in Figures 10 and 11 in which the frame 1ᵇ carrying the glass screens and provided with a soft lining, consists of a rigid sleeve, or of rigid frames connected by means of a flexible intermediate member, and has the shape of an elongated cross-section sleeve providing a flat arc shaped portion —A— at its top and a deep-arc portion —B— at its bottom portion, where it provides an expansion —C— with its edge spaced apart from the screen.

The described configuration of the goggle ensures the frames to be safely positioned on the wearer's face and prevents them from bearing with uneven and objectionable pressure on the wearer's face portions and leaving a space free for the passage of air into the space enclosed around the eye.

What I claim as my invention and desire to secure by United States Letters Patent is:—

In a goggle comprising, for each eye, a frame for supporting a screen, said frame including a split sleeve having a groove in its front and wherein said screen is engaged, a slotted connecting member carried by one of the ends of said split sleeve, said connecting member being adapted to overlap the other or second end of said split sleeve, cooperating means on said connecting member and said second named end of said split sleeve for their interengagement and an eye-shaped key pivoted on the first-named end of said split sleeve, said eye-shaped key passing through the slot of said connecting member and being adapted to take a position in which it locks said connecting member in engagement with said second end of said split sleeve, said eye-shaped key serving for attachment of the fastening means of the goggle.

In testimony whereof I have signed my name to this specification.

GIUSEPPE RATTI.